United States Patent Office 3,153,673
Patented Oct. 20, 1964

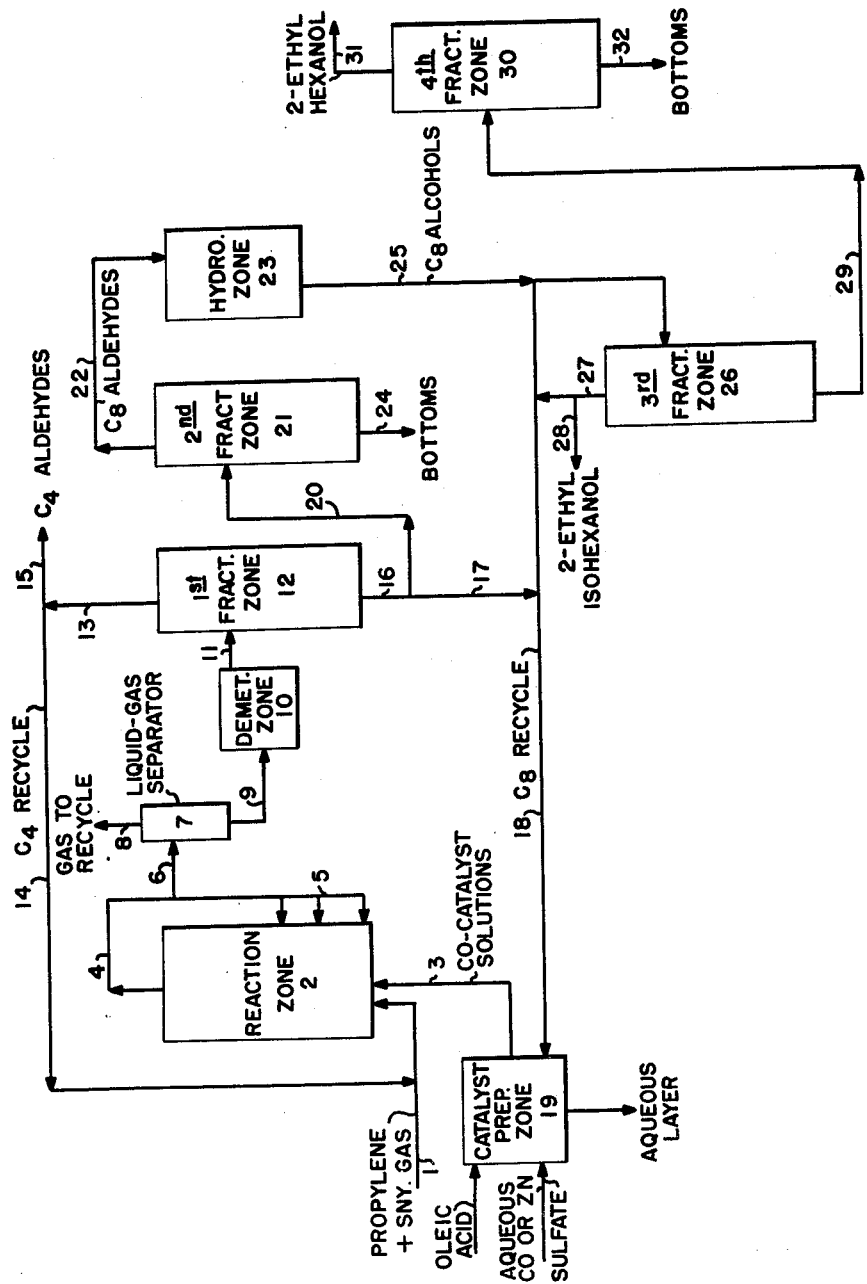

3,153,673
PRODUCTION OF ALDEHYDES AND ALCOHOLS
Charles Roming, Jr., Towaco, N.J., assignor to Esso Research and Engineering Company, a corporation of Delaware
Filed June 14, 1961, Ser. No. 117,006
2 Claims. (Cl. 260—638)

The present invention relates to the production of $C_8$ alcohols from propylene via the Aldox modification of the Oxo process. More particularly, it relates to a soluble co-catalyst system utilized in the Aldox production of 2-ethylhexanol. Still more particularly, it relates to a process for producing 2-ethylhexanol from propylene wherein a portion of the $C_8$ product is used as the solvent for the cobalt and zinc Aldox co-catalysts.

The conversion of lower olefins into aldehydes and alcohols having two more than twice as many carbon atoms as the olefin feed has become an important commercial process. The Aldox synthesis, as this process is known, is essentially a modification of the well-established oxo process wherein an olefin reacts with carbon monoxide and hydrogen in the presence of a cobalt carbonylation catalyst to produce oxygenated products, predominantly aldehydes having one carbon atom more than the olefin feed. These aldehydes then undergo an aldol type dimerization-dehydration reaction in the presence of a condensation catalyst to produce aldehydes having twice as many carbon atoms as the intermediate aldehyde. The dimerization-dehydration reaction can be carried out concurrently with the carbonylation reaction by adding the condensation catalyst to the oxo stage, or it may be accomplished by subjecting the carbonylation product or a portion thereof to the action of the condensation catalyst in a separate stage. The dimer aldehydes resulting therefrom can be hydrogenated to the corresponding alcohols by methods well known in the art. In this way, ethylene can be converted to $C_6$ aldehydes and alcohols, propylene to $C_8$ aldehydes and alcohols, butene-1 to $C_{10}$ aldehydes and alcohols and pentene-1 and hexene-1, respectively, to $C_{12}$ and $C_{14}$ aldehydes and alcohols. Generally speaking, olefins having a terminal double bond, i.e. Type I and Type III olefins of 2 to 6 carbon atoms, and especially propylene are preferred feeds to the Aldox process.

Although the Aldox reaction has been previously described in the Mason patent, U.S. 2,811,567 and elsewhere in the art, for a better understanding and for the purpose of making the present disclosure more self-contained, a brief description of the essential processing conditions will be indicated below. The carbonylation catalyst in the first or oxonation stage is preferably added in the form of an oil-soluble salt of cobalt or other suitably catalytic active metal. The cobalt salts of higher molecular weight carboxylic acids, e.g. $C_{10}$ to $C_{20}$ acids, are generally preferred. Thus, suitable catalysts are, for example, cobalt decanoate, oleate, linoleate, naphthenate, stearate, tallate, and the like. These salts are soluble in the normally liquid olefins and may be supplied to the first stage as a hydrocarbon solution dissolved in a portion of the olefin feed. Oil-insoluble forms of the carbonylation catalyst may be alternatively employed in the form of pastes or aqueous solutions or suspensions. These alternative types of catalysts include cobalt acetate, cobalt formate, cobalt oxide, cobalt carbonate, and the like.

In addition to the carbonylation catalyst, a dimerization-dehydration catalyst, preferably a zinc comprising compound, is employed as a modifier or Aldox co-catalyst. Compounds of many metals show some Aldox catalytic activity; however, none is quite so effective as zinc compounds. Those which approach zinc in Aldox catalytic activity are primarily compounds of Group II metals, particularly cadmium, magnesium, and beryllium. Lithium, vanadium, ferric iron, strontium and gold co-catalysts also exhibit catalytic activity, but to a lesser extent than the Group II metals enumerated above.

The Aldox modifier is also preferably added in an oil-soluble form, such as the salt of a higher molecular weight, e.g. a $C_{10}$ to $C_{20}$, carboxylic acid. Among the suitable acids are decanoic, oleic, linoleic, stearic, tall oil acids and naphthenic acids. Water-soluble compounds, such as zinc chloride or acetate, may also be used but with much greater care in this instance, since the zinc is much less liable to transfer into the oil or organic phase and thus promote the desired dimerization reaction. In this connection, the recycling of $C_4$ aldehydes and alcohols is particularly helpful, since it tends to solubilize sufficient quantities of the water-soluble catalysts in the organic phase so as to make them effective therein.

The ratio of cobalt oxonation catalyst to Aldox modifier is preferably maintained between 0.5 and 5 parts by weight of oxonation catalyst (calculated as metal) to 1 part of co-catalyst or modifier metal. Cobalt metal concentrations of from 0.05 to 2 wt. percent on fresh olefin feed and 0.02 to 1.5 wt. percent zinc are particularly suitable. If desired, an inert diluent, either liquid or gaseous, may be employed to aid in temperature control.

The synthesis gas fed to the carbonylation reactor may contain hydrogen and carbon monoxide in a wide range of proportions, e.g. from 0.5 to 4 moles of hydrogen per mole of carbon monoxide. Preferably, synthesis gas containing a hydrogen-carbon monoxide mole ratio of about 1/1 to 2/1 is employed. Pressures in the range of 500 to 5000 p.s.i.g. and the temperatures in the range of 200° to 450° F. are generally suitable. It is well known, however, that the pressures and temperatures may exceed the ranges set forth herein and it will be understood that the specific ranges noted are merely examples of preferred conditions. The ratio of synthesis gas to olefin feed may also vary widely and, in general, may be maintained between 2,000 to 15,000 standard cubic feet of synthesis gas per barrel of olefin feed.

The aldehydic product from the Aldox reaction will comprise principally monomeric and dimeric aldehydes with lesser quantities of the corresponding alcohols. Thus, when propylene is used as the feed, the crude aldehydic product generally contains about equal volumes of saturated $C_4$ aldehydes and both saturated and unsaturated $C_8$ aldehydes. After demetallizing, these aldehydes are usually passed with hydrogen through a hydrogenation unit utilizing a conventional hydrogenation catalyst at ordinary hydrogenation conditions, e.g. at temperatures of 250° to 550° F. and pressures from 500 to 4000 p.s.i.g. As a result, $C_4$ and saturated $C_8$ alcohols are obtained.

As pointed out hereinbefore, the preferred Aldox co-catalysts comprise oil-soluble cobalt and zinc salts of the same or different higher molecular weight acids, e.g. fatty acid soaps. While these may be supplied to the reactor in the form of pastes, etc., they are more conveniently handled in dissolved form. It is conventional to utilize a portion of the olefin feed as the solvent for the co-catalysts; however, in the production of 2-ethylhexanol from propylene, this is not practicable because of the volatility of the olefin feed at ambient and elevated temperatures and the relatively poor solubility of the metal soaps therein at lower temperatures. While the use of higher olefins or other hydrocarbons as catalyst solvents avoids these difficulties, such solvents are undesirable because of the attendant problem of separating them from the 2-ethylhexanol product so as to meet the stringent purity requirements necessary for many end uses, e.g., plasticizers. The use of lower molecular weight nonhydrocarbon solvents, such as the lower alcohols, is also unsatisfactory because of the relatively low solubility of the metal soaps therein and the high losses which occur during water washing, either in the preparation of the catalyst per se or in the subsequent demetallization of the crude Aldox reaction product.

It has now been found that these and other disadvantages are overcome by using a portion of the $C_8$ product as the solvent for the cobalt and zinc co-catalysts. The $C_8$ product is uniquely suitable as a solvent for the co-catalysts, since not only are contamination problems avoided which might arise from the use of solvents foreign to the process, but the $C_8$ material is also relatively insoluble in water, thereby avoiding the losses attendant with the use of lower molecular weight materials, e.g. lower alcohols. Furthermore, the solubility of the cobalt and zinc salts in the $C_8$ product is relatively high, so that suitably concentrated solutions of the catalysts can be prepared and pumped at practicable operating temperatures without danger of precipitation and plugging of equipment and transfer lines.

Either the unhydrogenated $C_8$ product from the Aldox reaction, obtained after removal of fractions boiling below the $C_8$ components, or the hydrogenated saturated $C_8$ alcohol product can be utilized as the catalyst solvent in the present process. It is preferred, however, to use the hydrogenated product, since some losses may occur due to side reactions when fractions containing aldehydic components are used. An especially preferred catalyst solvent is the hydrogenated $C_8$ fraction containing 2-ethyl isohexanol (2-ethyl-4-methyl-1-pentanol) since it is generally less useful than 2-ethylhexanol in the production of plasticizers and in other end uses. When a 2-ethyl isohexanol product of superior quality is desired, an additional advantage is realized when this fraction is employed as the catalyst solvent. It has been found that the ultimate quality of the 2-ethyl isohexanol fraction is markedly improved when at least a portion is recycled, since in this way, small but significant amounts of light ends, predominantly aldehydic in character, are more completely removed by the additional fractionation and/or hydrogenation steps through which the recycled product passes.

The present invention and its applications will be more readily understood from the following description, wherein reference will be had to the accompanying drawing.

Referring now to the drawing, propylene and synthesis gas are passed through line 1 into reaction zone 2. The cobalt and zinc co-catalysts dissolved in a portion of the $C_8$ product, preferably in 2-ethyl isohexanol, are simultaneously passed into reaction zone 2 through line 3. Generally, the amount of catalyst in each of the independently prepared solutions may vary from 10 to 60 percent, calculated on a weight basis, 20 to 55 wt. percent being preferred. Under the carbonylation conditions hereinbefore described, aldehyde comprising liquid products, including both $C_4$ monomer aldehydes as well as $C_8$ dimer aldehydes, are formed in the reactor. Both liquid products and unreacted gases are removed through line 4 and cooled. A portion of the cooled crude product may be pumped through line 5 for recycle to the reactor to aid in controlling the temperature therein. The remainder of the product is passed through line 6 into liquid-gas separator 7. Unreacted synthesis gas is removed through line 8 for recycle or purge as may be desired. The liquid products are passed through line 9 into demetallization zone 10, wherein the cobalt and zinc residues are removed. The demetallized liquid products are then passed through line 11 into fractionation zone 12 wherein the $C_4$ aldehydic components are separated overhead. A portion of the $C_4$ aldehydes may be recycled through lines 13, 14, and 1 to the reaction zone 2. For this purpose, it is preferred that the normal aldehyde be separated from the isoaldehyde by an additional fractionation step (not shown), and only the normal monomer aldehyde be recycled to the reaction zone. The $C_4$ aldehydic components not recycled are removed through line 15 for subsequent hydrogenation to the corresponding alcohols or for other uses as may be desired. The $C_8$ product is removed from the first fractionation zone through line 16. A portion thereof may be recycled via lines 17 and 18 to the catalyst preparation zone 19 for use as the co-catalyst solvent; however, as noted hereinbefore, it is preferred to use the hydrogenated $C_8$ product for this purpose. The $C_8$ product not recycled to the catalyst preparation zone is passed through line 20 to a second fractionation zone 21. The $C_8$ aldehydic and alcoholic components are separated from any heavier bottoms in 21, and are removed overhead through line 22 and passed to hydrogenation zone 23. The heavier bottoms are removed through line 24. In hydrogenation zone 23, the $C_8$ aldehydic components are hydrogenated to saturated alcohols under conventional hydrogenation conditions, including temperatures of from 250° to 550° F. and hydrogen pressures between 500 and 4000 p.s.i.g. Suitable hydrogenation catalysts include the sulfided hydrogenation catalysts such as molybdenum sulfide, copper chromite, and preferably nickel. Product from the hydrogenation zone is removed through line 25. A portion of the saturated $C_8$ alcohol product may be recycled through line 18 to the catalyst preparation zone 19 to serve as the catalyst solvent. The $C_8$ alcohol not recycled in this way is passed into fractionation zone 26, wherein the 2-ethyl isohexanol is separated overhead and removed via lines 27 and 28. Alternatively, instead of using the saturated $C_8$ alcohol product prior to fractionation as the catalyst solvent, a portion of the 2-ethyl isohexanol fraction is recycled through lines 27 and 18 to the catalyst preparation zone 19. The higher boiling 2-ethylhexanol fraction is removed from fractionation zone 26 through line 29 and passed to fractionation zone 30. The desired 2-ethylhexanol product is removed overhead through line 31, while any higher boiling bottoms are removed through line 32. The 2-ethylhexanol fraction may be subjected to further purification steps, e.g. caustic treating and final fractionation as may be desired.

The following examples will further serve to illustrate the advantages of the present process.

*Example I*

Oleic acid was dissolved in 2-ethyl isohexanol (2-ethyl-4-methyl-1-pentanol) and the solution intimately mixed with sufficient 1 to 2 wt. percent aqueous sodium hydroxide to reduce the acid number to between 1.8 and 2.5 milligrams KOH per milliliter. The resultant mixture was then intimately contacted with a chemically equivalent amount of nearly saturated aqueous cobalt sulfate solution. Upon standing, the mixture separated into an upper layer of cobalt oleate in 2-ethyl isohexanol solution and a lower water layer containing sodium sulfate. The upper layer was separated and washed with dilute aqueous cobalt sulfate solution before use in the experiments.

Zinc oleate dissolved in 2-ethyl isohexanol was prepared in the same manner.

Cobalt and zinc decanoates, tallates and naphthenates are prepared similarly by the reaction of the corresponding sodium salts of the acids with the cobalt and zinc sulfates.

Example II

The minimum temperatures at which solutions containing various concentrations of cobalt oleate and zinc oleate, prepared according to the manner described in Example I, in 2-ethyl isohexanol remained fluid were determined from the melting points.

| Catalyst | Wt. Percent | Melting Point, °F. |
|---|---|---|
| Cobalt oleate | 25 | <31 |
|  | 35 | <31 |
|  | 45 | <31 |
|  | 50 | 20 |
|  | 55 | <31 |
| Zinc oleate | 25 | 87 |
|  | 35 | 97 |
|  | 45 | 105 |
|  | 50 | 125 |
|  | 55 | 140 |

Pumpability tests showed that 50 wt. percent cobalt oleate in the $C_8$ alcohol was pumpable at temperatures as low as 20° F., while similar concentrations of zinc oleate were pumpable at temperatures above 125° F.

In comparison, to keep 50 wt. percent cobalt oleate or zinc oleate in solution either in n-butanol or isobutanol, temperatures greater than 135° F. were necessary.

Example III

As shown by the following water solubilities, determined in the range between 100 and 150° F., excessive losses of catalyst solvent due to extraction by water during catalyst preparation or demetallizing of the Aldox product are avoided by employing the $C_8$ alcohols.

| Solvent | Solubilities | |
|---|---|---|
|  | Wt. percent in Water | Wt. percent Water in— |
| $C_8$ Alcohols | Less than 0.1 | 3 |
| $C_4$ Alcohols | 6–7.5 | 16–23 |

While the invention has been described with reference to specific embodiments, those skilled in the art will recognize that modifications can be made without departing from the spirit thereof. It is intended, therefore, that the foregoing description and examples serve merely to illustrate the invention and that the scope thereof be limited solely by the appended claims.

What is claimed is:

1. In a process wherein 2-ethylhexanol is produced by reacting propylene with carbon monoxide and hydrogen in the presence of co-catalysts comprising 0.05 to 2 wt. percent cobalt and 0.02 to 1.5 wt percent zinc, calculated as metal on fresh olefin feed, in a reaction zone maintained at a temperature in the range of 200° to 450° F. and at a pressure between about 2000 and 5000 p.s.i.g., said cobalt and zinc being added to said reaction zone in dissolved form as the metal salts of oleic acids to produce a crude mixture containing $C_4$ and $C_8$ aldehydes, and said $C_8$ aldehydes are separated from said crude mixture and hydrogenated to produce a mixture of $C_8$ alcohols, the improvement which comprises separating said mixture of $C_8$ alcohols into a 2-ethyl isohexanol fraction and a 2-ethylhexanol fraction dissolving said cobalt and zinc salts in said 2-ethyl isohexanol fraction, and recycling a portion of said 2-ethyl isohexanol fraction containing dissolved therein said cobalt and zinc salts to said reaction zone.

2. A process acording to claim 1 wherein the portion of said 2-ethyl isohexanol fraction recycled to said reaction zone contains dissolved therein from 20 to 55 wt. percent of each of said cobalt and zinc salts.

References Cited in the file of this patent
UNITED STATES PATENTS

| | | |
|---|---|---|
| 2,811,567 | Mason | Oct. 29, 1957 |
| 2,816,933 | Mertzweiller | Dec. 17, 1957 |
| 2,820,067 | Mertzweiller et al. | Jan. 14, 1958 |
| 2,912,464 | Hess et al. | Nov. 10, 1959 |